United States Patent Office 3,390,055
Patented June 25, 1968

3,390,055
FERMENTATIVE PRODUCTION OF N-ETHYLOXYTETRACYCLINE
Eugene L. Dulaney, Metuchen, and Irving Putter, Martinsville, N.J., assignors to Merck & Co., Inc., Rahway, N.J., a corporation of New Jersey
No Drawing. Original application Apr. 5, 1962, Ser. No. 185,233. Divided and this application Jan. 21, 1965, Ser. No. 442,223
6 Claims. (Cl. 195—80)

This is a division of application Ser. No. 185,233, filed Apr. 5, 1962 and now abandoned.

This invention relates to new tetracyclines and processes of preparing the same. More particularly, it is concerned with the preparation of new tetracyclines wherein one of the N-methyl substituents is an ethyl substituent.

The tetracycline group of antibiotics such as tetracycline, chlortetracycline and oxytetracycline have been found to be very valuable broad spectrum antibiotics. In addition, certain derivatives of these tetracyclines such as the 6-demethyl tetracyclines have also been found to be valuable antibiotics. All of these previously known antibiotics are characterized by having a dimethylamino substituent at position 4.

It is an object of the present invention to provide new tetracycline antibiotics having a methyl ethyl amino substituent at position 4. An additional object is to provide processes for preparing tetracycline antibiotics having a methyl ethyl amine substituent at position 4. Other objects will be apparent from the detailed description of our invention hereinafter provided.

In accordance with the invention, it is now found that tetracyclines having an N-ethyl methyl substituent at the 4 position are obtained by growing a tetracycline producing microorganism in aqueous mediums in the presence of ethionine. Thus, pursuant to a specific embodiment of the present invention, N-ethyloxytetracycline, or 4-ethylmethylamino - 1,4,4a,5,5a,6,11,12a-octahydro-3,5,6,10,12, 12a - hexahydroxy-6-methyl-1,11-dioxo-2-napthacenecarboxamide, is produced by growing an oxytetracycline producing strain of microorganism in the presence of a minor amount of ethionine. The structure of the N-ethyl-oxytetracycline produced can be represented as follows:

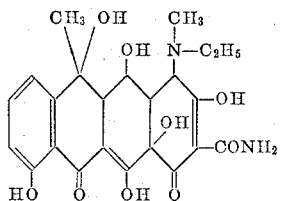

Thus, N-ethyloxytetracycline is produced together with oxytetracycline when *Streptomyces rimosus* is grown in suitable fermentation mediums containing a minor amount of ethionine. After the completion of the fermentation, the mixed antibiotics are recovered from the fermentation broth, and the desired N-ethyltetracycline separated from said mixture.

The amount of ethionine in the fermentation medium will depend upon a particular oxytetracycline producing microorganism and the amount of methionine present in the medium constituents and synthesized by the organism. It is found that mediums containing more methionine will require larger amounts of ethionine. In general, it is necessary that the medium contain at least 5 μg. of ethionine per ml. of medium in order to produce the N-ethyltetracycline. The optimum amount needed for a particular microorganism can readily be determined experimentally by carrying out a few fermentations with mediums containing various amounts of ethionine. The ethionine used to supplement the fermentation mediums can be d-ethionine, l-ethionine, dl-ethionine or mixtures thereof.

It is found that various strains of *Streptomyces rimosus* and auxotrophs thereof prepared by mutation are satisfactory in producing N-ethyloxytetracycline by fermentation in the presence of ethionine. Thus, the strain of *Streptomyces rimosus* deposited in the culture collection of the Fermentation Division of the Northern Regional Research Laboratories at Peoria, Ill., as NRRL 2234 can be grown in the presence of ethionine to produce the new antibiotic of the present invention.

Pursuant to another specific embodiment of this invention, it is found that certain methionine dependent auxotrophs of *Streptomyces rimosus* obtained by ultraviolet irradiation in accordance with procedures known in this art are especially useful in producing N-ethyloxytetracycline. One such auxotroph which is identified in the culture collection of Merck & Co., Inc. at Rahway, N.J. as MA 935 has been deposited in the culture collection of the Northern Regional Research Laboratories where it is identified as NRRL 2970.

The following examples are presented to illustrate methods of producing the new tetracycline of the present invention.

Example 1

A methionine dependent auxotroph of *Streptomyces rimosus* NRRL 2970 is grown as follows:

Inoculum is developed for three days at 28° C. on rotary shakers moving at 220 r.p.m. in 50 ml. of the following medium in 250 ml. Erlenmeyer flasks:

| | |
|---|---|
| Starch | g-- 30 |
| $(NH_4)_2SO_4$ | g-- 5 |
| Dextrose | g-- 2 |
| $CaCO_3$ | g-- 5 |
| NaCl | g-- 5 |
| $K_2HPO_4$ | g-- 2 |
| $MgSO_4 \cdot 7H_2O$ | g-- 1 |
| $FeSO_4 \cdot 7H_2O$ | mg-- 10 |
| $ZnSO_4 \cdot 7H_2O$ | mg-- 10 |
| l-methionine | mg-- 100 |
| Distilled water to 1 liter. | |

The resulting growth is washed twice with 0.85% NaCl solution and made up to volume in fresh saline. Two and one-half ml. of washed growth is used to inoculate 50 ml. of production medium in a 250 ml. flask. The production medium is made as follows:

| | |
|---|---|
| Sucrose | g-- 40 |
| Cottonseed Endosperm Flour | g-- 8 |
| $(NH_4)_2SO_4$ | g-- 6 |
| $CaCO_3$ | g-- 11 |
| $ZnSO_4 \cdot 7H_2O$ | mg-- 30 |
| Distilled water at 1 liter. | |

Replicate flasks also receive 200 μg./ml. of l-methionine and others 100 μg./ml. of dl-ethionine.

The inoculated production flasks are incubated at 28° C. on rotary shakers moving at 200 r.p.m. for 90 hours.

They are then assayed for total antibiotic productivity using a cylinder plate agar diffusion assay.

Extracts of the broths are made for chromatography as follows:

The broth is acidified to pH 1–2 with HCl, filtered through paper and the filtrate extracted twice with equal volumes of n-butanol. The n-butanol extracts are combined, the n-butanol removed by lyophilization and the residue taken up in two ml. of pure methanol. The methanol extracts are used for spotting paper chromatograms. MacIlvaine's buffer at pH 4.7 is used to wet the paper prior to applying the extracts. Ethyl acetate is used as the mobile phase. After development, the papers are dried, treated with ammonia vapors and examined with ultraviolet light. The U.V. fluorescing areas are marked with a pencil and the paper chromatograms laid on a plate seeded with *Escherichia coli*. After incubation overnight, the bioactive areas are noted. In each of the fermentations carried out with the auxotroph, oxytetracycline is found to be the major antibiotic in the broths. However, a more mobile, bioactive product is also present in the cultures. This more mobile product is N-ethyloxytetracycline.

Example 2

Fermentation broth, prepared as described in Example 1, is acidified with hydrochloric acid to pH 1.5–2.0 and filtered. To the filtrate is added 25% by weight of sodium chloride. The resulting solution is extracted with n-butanol using multiple extractions. The butanol layers are combined, two volumes of light petroleum ether added and the tetracyclines recovered in the water phase using multiple extractions at pH 1–2. The aqueous extracts are combined, neutralized to pH 3, and concentrated under reduced pressure to one tenth the broth volume.

2800 ml. of concentrate containing bioactivity equivalent to 22.5 mg. of oxytetracycline obtained in this way is extracted with butanol at pH 1.5–2.0; the butanol is concentrated to 60 ml. and extracted three times with 60 ml. of water at pH 1.5–2.0. The water extracts are adjusted to pH 9. After adding 45 g. of sodium chloride, the solution is extracted three times with 180 ml. of butanol. The butanol solution is adjusted to pH 3 and concentrated to 30 ml. and the tetracycline extracted into 2–30 ml. portions of water at pH 1.5. The water extract is concentrated to dryness at low temperature and the residue dissolved in 5 ml. of methanol. This solution contained bioactivity equivalent to 3 mg. of oxytetracycline.

Four Whatman 3 mm. filter paper sheets 7" wide were wet with pH 4.5 MacIlvaine buffer and the concentrate streaked evenly on the four sheets. The chromatogram is developed for four hours and the zones visualized by inspection of the sheets with ultraviolet light. The irregular zone containing the N-ethyloxytetracycline is cut out and slurried with pH 4.5 phosphate buffer. The buffer eluate contains 100γ of bioactivity as oxytetracycline and gives a typical oxytetracycline ultraviolet absorption spectrum.

Example 3

Twenty gallons of fermentation broth produced as described in Example 1 is extracted into butanol and back into water. The water solution, 12 liters, is concentrated further by the following procedures:

To the 12 l. of concentrate is added 5 liters of ethyl acetate, 250 g. of sodium barbital and 10 g. of calcium chloride. The pH is adjusted to 8.8–9.2 and the phases separated. The solvent phase is washed with one 20 liter portion of water containing 100 g. of sodium barbital and 10 g. of calcium chloride and 4×10 liter portions of water saturated with ethyl acetate. Most of the oxytetracycline is discarded in the washes. The residual ethyl acetate is diluted with an equal volume of light petroleum ether and extracted 5 times with 0.1 N hydrochloric acid. These extracts are combined into two fractions and freeze-dried yielding the following products: Fraction I, 670 mg., biopotency 10.5 γ/mg. Fraction II, 2.2 g., biopotency 18 γ/mg.

300 mg. from Fraction I is dissolved in methanol, precipitated with ether, redissolved in methanol and streaked on 4" x 7" sheets of Whatman 3 mm. paper. Elution of the separated zone gives 500γ of single spot material by ultraviolet absorption. Similar treatment with 1.5 g. of the 2.2 g. fraction yielded 250γ of N-ethyloxytetracycline.

Example 4

An aqueous medium containing the following nutrients:

| | Percent |
|---|---|
| Soluble starch | 3 |
| Dextrose | 0.2 |
| $(NH_4)_2SO_4$ | 0.5 |
| $CaCO_3$ | 0.5 |
| NaCl | 0.5 |
| $K_2HPO_4$ | 0.2 |
| $MgSO_4 \cdot 7H_2O$ | 0.1 |
| $FeSO_4 \cdot 7H_2O$ | 0.001 |
| $ZnSO_4 \cdot 7H_2O$ | 0.001 |
| dl-Methionine | 0.02 | is prepared and 50 ml. of the medium in 250 ml. flasks are sterilized by heating at 120° C. for fifteen minutes.

The sterilized medium is inoculated with the growth from an agar slant of culture NRRL 2970 suspended in 10 ml. of the sterile medium. The flask is incubated for three days on a rotary shaker at 28° C.

At the end of this incubation period, 10 ml. of the broth is used to inoculate 400 ml. of the above-described sterile medium in a 2-liter Erlenmeyer flask. The inoculated medium is then inoculated for three days at 28° C.

The resulting broth is used to inoculate about 40 gallons of the above-described sterile medium in a fifty gallon stainless steel fermentor. The fermentation is then allowed to proceed with aeration and agitation for 48 hours at 28° C. About 43 liters of the fermented broth so obtained is used to inoculate 120 gallons of the sterile production medium having the following composition:

| | Percent |
|---|---|
| Cottonseed endosperm flour | 2 |
| dl-Ethionine | 0.01 |
| Glycerol | 4 |
| $ZnSO_4$ | 0.003 |
| $CaCO_3$ | 1 | pH before sterilization 6.7.

The fermentation is allowed to proceed with aeration and agitation for 120 hours at 28° C.

Samples of the broth are analyzed by paper strip chromatography and bioautography. The broths were found to contain oxytetracycline and N-ethyloxytetracycline. Based on this method of assay, using a chlortetracycline standard, the broth is found to contain approximately 8 μg./ml. of the N-ethyloxytetracycline at the end of the fermentation period.

Example 5

A fermentation is carried out as described in Example 4 using culture NRRL 2970, a methionine dependent auxotroph.

After completion of the fermentation, the 110 gallons of broth is adjusted to pH 1.5 with hydrochloric acid and filtered. To the filtered broth is added 150 g. of sodium chloride per liter of broth, and the broth extracted three times with one fifth volume of n-butanol. The solvent extracts are combined and washed twice with one-tenth volume of 15% sodium chloride at pH 9. The butanol layer is evaporated in the presence of water at pH 2.5 to an aqueous concentrate having a volume of about four liters.

To the four liters of concentrate is added 1.86 liters of a water solution containing 360 g. of $BaCl_2 \cdot 2H_2O$ and 48 g. $MgCl_2 \cdot 6H_2O$ per liter of water, and the solution adjusted to pH 8.5 with sodium hydroxide. The precipitate which formed is recovered by centrifugation and then slurried with 280 ml. of water. The slurry is adjusted to pH 1.5 with sulfuric acid and the barium sulfate separated and washed with water. The acid soluble portion is adjusted to pH 7 thereby precipitating the tetracycline antibiotics as the barium-magnesium salts. The precipitate is recovered and dissolved in methanol. This solution is found to contain the equivalent of 4.7 g. of tetracyclines as determined by the U.V. measurement at 355 mμ. Paper chromatography indicated that about 7% of the total tetracyclines is N-ethyloxytetracycline.

The methanol solution is chromatographed on 3 mm. paper using the partition system ethyl acetate-pH 4.7 phosphate buffer (0.05 M). The spot on the paper corresponding to N-ethyloxytetracycline, as seen by fluorescence, is cut out of the paper and the activity eluted with 0.01 N hydrochloric acid. The acidic solution so obtained is found to contain 73 mg. of N-ethyloxytetracycline as determined by U.V. absorption. The antibiotic is extracted into n-butanol and the solvent evaporated to about 20 ml. This concentrate is then subjected to a 20 plate extended multiple extraction using the partition system 0.01 N HCl vs. butanol. In this system 20 ml. of butanol equilibrated with lower phase was placed in 20 extraction vessels and then twenty 20 ml. portions of 0.01 N hydrochloric acid contacted with each of the butanol phases in such a way that water phase No. 1 is extracted successively with each butanol phase (the last butanol is numbered 20) and then water phase No. 2 is treated in a similar manner, etc. At the completion of the operation, the N-ethyloxytetracycline is obtained by combining butanol phases 14–20 and water phases 13 through 20. The solutions are evaporated into butanol at pH 3.3. Butanol insoluble salts are filtered off and the rich butanol filtrate is evaporated into water to yield a solution containing one mg. per ml. of N-ethyloxytetracycline.

Example 6

Following the procedure described in Example 1, *Streptomyces rimosus* was grown in a medium containing 50 microcuries of 1-ethionine in which the ethyl group is $C_{14}$ labeled on carbon 1. After the completion of the fermentation, the labeled tetracycline is isolated by paper strip chromatography following the procedures described in Example 2. The radio active tetracycline was found to be a single component material when chromatographed in several solvent systems with the U.V. and radio activity coinciding.

Alkaline hydrolysis of the radio active tetracycline showed that all of the radio activity in the sample was associated with the volatile amine which was liberated on degradation. The amine so liberated was identified using the chromatographic method as methyl ethyl amine. This analysis was also confirmed by NMR spectroscopy.

This experiment showed the unknown to the N-ethyloxytetracycline.

Example 7

Fifty ml. of an aqueous solution containing 1.03 mg. of N-ethyloxytetracycline per ml. (based on ultraviolet absorption at $$353\ m\mu\ E_{1\%}^{1\ cm.} = 265)$$

is treated with 1.5 ml. of an aqueous solution of barium and magnesium salts (36 g. $BaCl_2 \cdot 2H_2O$ + 4.8 g. $MgCl_2 \cdot 6H_2O$ per 100 ml.), and the mixture adjusted to pH 8.5 with sodium hydroxide. The barium magnesium salt of N-ethyloxytetracycline which is precipitated is separated by centrifugation, washed with water, lyophilized and dried at 57° C. for 6 hours in vacuo. The solid obtained weighed 40 mg.

The ultraviolet absorption spectrum of the dried barium magnesium salt is found to have peaks at 270 mμ and 353 mμ which are identical to the position of the peaks for oxytetracycline in 0.01 N HCl.

$$E_{1\%}^{1\ cm.}$$

of the barium magnesium salt is found to be 268 at 353 mμ.

The infrared spectrum of the barium magnesium salt of N-ethyloxytetracycline is indistinguishable from that of oxytetracycline.

A solution containing 100γ of N-ethyloxytetracycline is assayed in triplicate by agar plate diffusion with the stamp procedure on concentrations of 40 μg./ml. and 10 μg./ml. The results of these tests run in comparison with samples of oxytetracycline (40 μg./ml. and 10 μg/ml.) and tetracycline (20 μg./ml. and 5 μg./ml.) are shown in the following table:

ANTIBACTERIAL SPECTRUM OF N-ETHYLOXYTETRACYCLINE

| Test Organism | Average Inhibition Zone Diameter, mm. | | | | | |
|---|---|---|---|---|---|---|
| | N-ethyl-oxy-tetra-cycline, 40 μg./ml. | Oxy-tetra-cycline, 40 μg./ml. | Tetra-cycline, 20 μg./ml. | N-ethyl-oxytetra-cycline, 10 μg./ml. | Oxy-tetra-cycline, 10 μg./ml. | Tetra-cycline, 5 μg./ml. |
| *Escherichia coli* W (MB-60) (ATCC 9637) | 24 | 23 | 19 | 17 | 18 | 14 |
| *Bacillus* sp. (MB-633) | 39 | 36 | 35 | 31 | 31 | 26 |
| *Proteus vulgaris* (MB-1012) | 16 | 16 | 11 | 14 | 14 | 0 |
| *Pseudomonas aeruginosa* (MB-979) | 22 | 19 | 16 | 14 | 15 | 0 |
| *Serratia marcescens* (MB-252) (ATCC 990) | 0 | 0 | 0 | 0 | 0 | 0 |
| *Staphylococcus aureus* (MB-108) 209P | 42 | 38 | 41 | 36 | 36 | 33 |
| *Bacillus subtilis* (MB-964) (ATCC 6633) | 40 | 36 | 34 | 31 | 33 | 29 |
| *Sarcina lutea* (MB-1101) (ATCC 9341) | 37 | 32 | 35 | 27 | 27 | 27 |
| *Staphylococcus aureus*—Streptomycin Resistant (MB-698) | 31 | 33 | 32 | 26 | 28 | 28 |
| *Streptococcus faecalis* (MB-753) 100 Cl | 21 | 22 | 21 | 19 | 23 | 17 |
| *Alcaligenes faecalis* (MB-10) (ATCC 213) | 21 | 19 | 16 | 12 | 7 | 0 |
| *Brucella bronchiseptica* (MB-965) (ATCC 4617) | 38 | 30 | 30 | 29 | 22 | 23 |
| *Salmonella gallinarum* (MB-1287) | 26 | 25 | 19 | 19 | 20 | 13 |
| *Vibrio percolans* (MB-1272) (ATCC 8461) | 36 | 32 | 29 | 29 | 29 | 24 |
| *Xanthomonas vesicatoria* (MB-615) | 27 | 27 | 23 | 21 | 22 | 16 |

N-ethyloxytetracycline solution is also assayed versus *E. coli* by the stamp method with agar plates buffered with 0.1 M phosphate at pH 5 and 9. The results of these assays compared to results obtained with oxytetracycline, tetracycline and chlortetracycline are shown in the following table:

| *E. coli* W (MB-60) 0.1 M phosphate buffered agar | Average Inhibition Zone Diameter, mm. | | | |
|---|---|---|---|---|
| | N-ethyl-oxy-tetra-cycline, 40 μg./ml. | Oxy-tetra-cycline, 40 μg./ml. | Tetra-cycline, 20 μg./ml. | Chlor-tetra-cycline, 20 μg./ml. |
| pH 5 | 26 | 25 | 19 | 23 |
| pH 9 | 27 | 26 | 23 | 16 |

The paper chromatograms of N-ethyloxytetracycline were compared with five known tetracyclines in the following partition systems by descending chromatography:

I—Ethyl acetate, MacIlvaine buffer pH 4.5 (stationary phase)

II—Nitromethane-chloroform-pyridine (20-10-3), 0.1 M pH 3 phosphate buffer (stationary phase)
III—Butanol-chloroform (9-1), 0.3 M phosphoric acid—0.1% trichloroacetic acid pH 2
IV—Butanol, 0.1 M pH 3 phosphate buffer The movement of the tetracyclines is tabulated in mm. in the following table:

| Solvent System | I | II | III | IV |
|---|---|---|---|---|
| OXT, distance from origin | 55 | 26 | 27 | 25 |
| CTC, distance from origin | 115 | 75 | 60 | 50 |
| TC, distance from origin | 45 | 44 | 27 | 25 |
| NEO, distance from origin | 115 | 43 | 37 | 31 |
| 6-deoxy OXT | 27 | 26 | | |
| 6-deoxy TC | 90 | 26 | | |

OXT=Oxytetracycline; CTC=Chlortetracycline; TC=Tetracycline; and NEO=N-ethyloxytetracycline.

The N-ethyloxytetracycline has the same mobility as chlortetracycline in system I and tetracycline in system II. However, differing mobilities in system III and IV clearly differentiate the new tetracycline from any of the knowns.

The ultraviolet light absorption spectrum of N-ethyloxytetracycline characterizes it as a tetracycline.

Stability in acid and alkali is characteristic of the tetracyclines. Since the first step in the degradation of tetracyclines having a tertiary hydroxyl at $C_6$ is dehydration of this hydroxyl, marked stabilization is obtained by either removing the hydroxyl (6-deoxy series) or the methyl (6-demethyl series). These derivatives are quite stable even in 0.1 N acid or alkali. Rapid destruction of the ultraviolet absorption on treatment with 0.1 N alkali indicates that the new tetracycline has a tertiary hydroxyl at $C_6$.

When the new tetracycline is heated overnight at 60° C. in 0.5 N HCl, a new substance having ultraviolet absorption peaks at 248 and 370 is produced. These peaks are characteristic of apoxytetracycline and indicate the presence of a 5-hydroxy group.

N-ethyloxytetracycline is an amphoteric compound which forms salts with both acids and bases. These salts can be prepared in the same way as the salts of the known tetracyclines such as chlortetracycline, oxytetracycline and tetracycline. The acid and metal salts of N-ethyloxytetracycline are obtained by intimately contacting the amphoteric compound with an equivalent of the acid or base in a suitable solvent such as water, and then evaporating the solution to obtain the salt in solid form. Thus, the new tetracycline can be reacted with acids such as hydrochloric, sulfuric, phosphoric to produce the corresponding acid salts, or with bases such as alkali metal or alkaline earth hydroxides to produce the corresponding metal salts.

In vivo tests, using four-fold dilution increments of drug with five mice at each level, show the N-ethyloxytetracycline to be less active than oxytetracycline when used intraperitioneally against infection with *Streptococcus pyrogenes* C-203 or *Salmonella schottmuelleri* MI, and intraperitoneally or subcutaneously against infection with *Staphylococcus aureus* Smith. However, it was observed to be about twice as active as oxytetracycline when used intraperitoneally against infection with *Proteus vulgaris* 1810.

The new antibiotic and its acid and metal salts of this invention are valuable bactericidal substances which are active against various gram-positive and gram-negative microorganisms. As indicated above, they are similar in activity to the other tetracycline antibiotics and hence useful for many of the same purposes as these products, for example, as therapeutic agents. It can also be used as a germicidal agent, for example, for the sterilization of pharmaceutical equipment and the like. N-ethyloxytetracycline is useful in the isolation of microorganisms from soil samples. Thus, by adding a small amount of the antibiotic or a salt thereof to the agar medium upon which the soil samples are plated, the growth of many of the organisms contained in the soil is inhibited. This inhibition of the growth of many of the bacteria facilitates the recovery of individual colonies of microorganisms from the plated agar.

Various changes and modifications of the invention can be made, and to the extent that such variations incorporate the spirit of this invention, they are intended to be included within the scope of the appended claims.

We claim:

1. A process for preparing N-ethyloxytetracycline which comprises growing an oxytetracycline producing strain of *Streptomyces rimosus* in an aqueous nutrient medium in the presence of ethionine.

2. A process for preparing N-ethyloxytetracycline which comprises growing an oxytetracycline producing strain of *Streptomyces rimosus* in an aqueous nutrient medium in the presence of ethionine, recovering the antibiotics from the resulting fermentation broth and separating said tetracycline from the recovered antibiotics.

3. The process according to claim 2 wherein the oxytetracycline producing microorganism is a strain of *Streptomyces rimosus* with a mutational block in methionine synthesis.

4. A process for producing 4-dedimethylamino-4-methylethylamino-5-hydroxytetracycline which comprises cultivating a 5-hydroxytetracycline producing strain of a species of *S. rimosus* in an aqueous nutrient medium containing assimilable sources of carbohydrate, nitrogen and inorganic salts and containing at least 0.05 mg./ml. of l-ethionine under submerged aerobic conditions until substantial quantities of 4-dedimethylamino-4-methylethylamino-5-hydroxytetracycline are produced in said medium, and recovering the 4-dedimethylamino-4-methylethylamino-5-hydroxytetracycline so produced.

5. A process for producing 4-dedimethylamino-4-methylethylamino-5-hydroxytetracycline which comprises cultivating a 5-hydroxytetracycline producing strain of a species of *S. rimosus* in an aqueous nutrient medium containing assimilable sources of carbohydrate, nitrogen and inorganic salts and containing at least 0.10 mg./ml. of dl-ethionine under submerged aerobic conditions until substantial quantities of 4-dedimethylamino-4-methylethylamino-5-hydroxytetracycline are produced in said medium, and recovering the 4-dedimethylamino-4-methylethylamino-5-hydroxytetracycline so produced.

6. A process for producing 4-dedimethylamino-4-methylethylamino-5-hydroxytetracycline which comprises cultivating a 5-hydroxytetracycline producing strain of a species of *S. rimosus* in an aqueous nutrient medium containing assimilable sources of carbohydrate, nitrogen and inorganic salts and containing at least 0.10 mg./ml. of l-ethionine under submerged aerobic conditions until substantial quantities of 4-dedimethylamino-4-methylethylamino-5-hydroxytetracycline are produced in said medium, and recovering the 4-dedimethylamino-4-methylethylamino-5-hydroxytetracycline so produced.

References Cited
UNITED STATES PATENTS

| 2,516,080 | 7/1950 | Sobin et al. | 195—80 |
| 3,022,347 | 2/1962 | Tanner et al. | 195—80 |
| 3,159,552 | 12/1964 | Miller et al. | 195—80 |

M. W. GREENSTEIN, *Primary Examiner.*

A. LOUIS MONACELL, *Examiner.*

D. M. STEPHENS, *Assistant Examiner.*